UNITED STATES PATENT OFFICE.

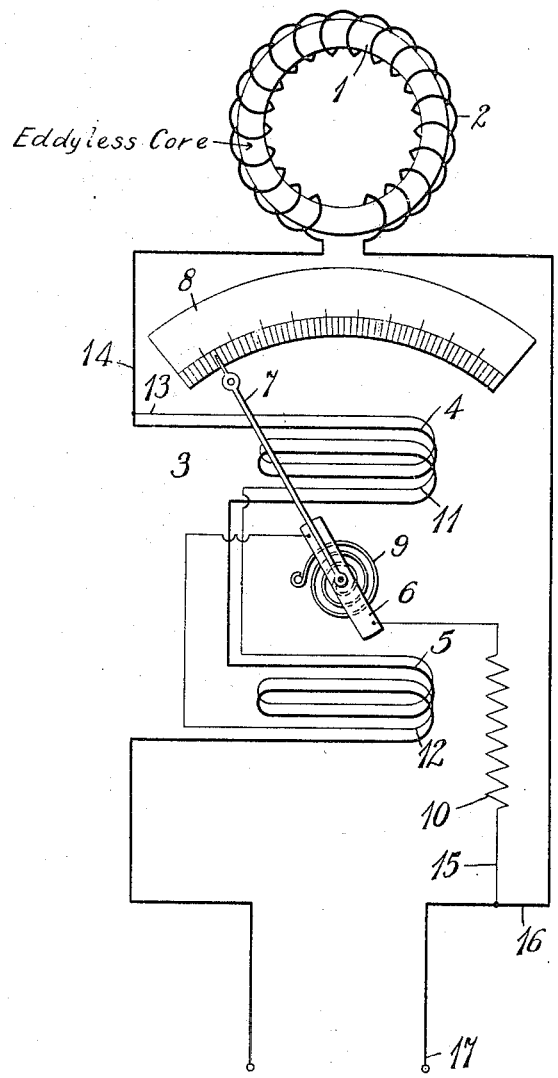

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,181,211.  Specification of Letters Patent.  Patented May 2, 1916.

Application filed April 10, 1911. Serial No. 620,171.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Electrical Measuring Instruments, of which the following is a specification.

My invention relates to electrical measuring instruments, and it has for its object to provide an instrument of the above-indicated class that shall be simple, compact and durable in construction, accurate and reliable in operation, and be particularly adapted to indicate the average or arithmetic mean of the instantaneous values of an alternating electro-motive force wave of a given frequency.

Heretofore, electrical measuring instruments which have been employed for indicating the voltages of alternating current sources of energy have been so constructed as to register the square-root-of-the-mean-square value of the instantaneous voltages. However, recent developments in the electrical art have made it desirable to produce an instrument which is adapted to measure average values of voltage waves, without regard to sign, in order that determinations of the form factor thereof may be readily made. A knowledge of the form factor of electromotive force waves is particularly desirable in some classes of electrical testing work, and in the design and construction of electrical apparatus to be used to supply certain types of systems.

Formerly, the determination of the form factor of a voltage wave has been accomplished through the agency of an oscillograph or a synchronous commutator, but such determinations involved very delicate and expensive apparatus and necessitated more or less complicated calculations. Hence the importance of a simple device whereby the form factor is easily determined.

Inasmuch as the form factor of a voltage wave is merely a ratio between root-mean-square and average volts, it is evident that, if an instrument such as I have devised be employed in connection with the usual root-mean-square voltmeter, the determination of the form factor is a simple matter.

It is well known to those skilled in the art that the core loss of a piece of electrical apparatus is composed of a loss due to eddy currents and a loss due to hysteresis. Moreover, the eddy current loss is dependent upon the square-root-of-the-mean-square value of the impressed electromotive force, while the hysteresis loss is dependent upon the maximum value of magnetic induction in the iron which, in turn, is dependent upon the average of the instantaneous values of the impressed electromotive force.

According to my invention, I provide an instrument which is based upon the principle just recited and which consists of an iron core constructed of extremely thin laminations of magnetic material and practically free from eddy currents, and the hysteresis of which is independent of the wave form of the voltage impressed upon its windings. For convenience, I term such a core an "eddyless core," by which I mean that no eddy currents are set up therein when voltage is supplied to its winding. Hence, the eddy current losses are eliminated and the core loss consists entirely of hysteretic losses.

The above mentioned core is employed in connection with a suitable meter mechanism which will measure energy input to the core and which has compensating coils to subtract or neutralize any torque due to copper losses in its own windings, which torque would be dependent upon the square-root-of-the-mean-square value of the voltage. Since the iron core has no eddy currents and, since the meter mechanism does not register any copper losses, which are dependent upon the square-root-of-the-mean-square values of electromotive force, it is evident that the deflection or torque of the instrument will be entirely dependent upon the hysteresis loss in the core and will be a function of the maximum magnetic induction which is, in turn, proportional to the area of the impressed voltage wave or to the average value thereof.

My invention may best be understood by reference to the accompanying drawing, the single figure of which is a diagrammatic view of the circuit connections and arrangement of parts of an electrical measuring instrument which embodies my invention.

Referring to the drawing in detail, the device herein shown comprises a magnetizable core member 1 having a winding 2, and a meter mechanism 3 which comprises stationary windings 4 and 5, a movable coil or winding 6 disposed in electro-magnetic relation thereto, an indicator or pointer 7 attached to the coil 6 and adapted to traverse a suitable scale 8, a spiral spring 9 to oppose the torque of the coil 6, a non-inductive resistance 10 and compensating coils 11 and 12 for a purpose to be hereinafter set forth.

The magnetizable core member 1 is so constructed as to be free from eddy currents when voltage is impressed upon its winding 2, this being an essential feature of my invention. Such a core may be conveniently made from a plurality of extremely thin laminations of magnetizable material or, in some cases, it may be expedient to build it of alternate layers of very thin paper and extremely thin laminations.

I desire it to be understood that the core member 1 is not restricted in any way to the structural details just mentioned, as any core member which is so constructed as to prevent the development of eddy currents, may be employed for the same purpose.

The stationary windings 4 and 5 constitute the series coils of the instrument and are connected in series with the winding 2 of the magnetizable eddyless core member 1, while the movable winding or coil 6 is connected in shunt thereto through the non-inductive resistance 10, and the compensating windings 11 and 12. The lead 13 of the compensating winding 11 is connected to conductor 14 between the series coil 4 and the winding 2, and the lead 15 of the resistance 10 is connected to conductor 16 adjacent to one of the terminals 17 of the instrument. Thus, it is evident that the compensating windings 11 and 12, the movable coil 6 and the resistance 10 are connected directly across the winding 2 of the eddyless magnetizable core 1 and the current therein is therefore affected by the potential drop across said winding, while the series coils 4 and 5 are connected on the line side of this shunt circuit.

It is well known that the deflection of an instrument which is affected by the copper losses in its own windings is influenced by the square-root-of-the-mean-square value of the impressed voltage, and, therefore, inasmuch as the instrument of my invention is to be adapted to indicate average values, it becomes necessary to exclude the effect of these copper losses.

It has been pointed out that the extremity of the compensating coils 11 and 12 is connected to conductor 14 between the series coil 4 and the winding 2 and, hence, the deflection of the instrument is independent of the copper losses in said series coils.

In order to annul or compensate for the effect of the copper losses in the shunt circuit, I provide the compensating coils 11 and 12 with the same number of turns as the series coils 4 and 5 and connect the same in opposition to the series coils whereby the influence of the copper losses in the shunt coil 6, the compensating coils 11 and 12 and the resistance 10 is subtracted or eliminated.

It will be understood that the instrument is essentially a wattmeter, the shunt circuit, including the movable coil 6, being adapted to measure the drop across the winding 2, while the series circuit, including the series coils 4 and 5, is traversed by the current passing through the winding 2 plus that traversing the movable coil 6. However, by connecting the compensating coils in the manner hereinbefore described, the influence of the series coils, by reason of the current which traverses the shunt circuit, is neutralized and, hence, the instrument measures only the power consumed in the magnetizable core member 1.

Inasmuch as the core member 1 is so constructed as to be free from eddy currents, it is evident that the power expended therein depends upon the maximum induction in the iron which is proportional to the area of the impressed voltage wave or to the average value thereof. Thus, if the scale 8 be calibrated to read the average volts of a given circuit, it will read the average volts of any circuit of the same normal frequency to which it may be connected.

I have illustrated my invention as embodying an instrument of a particular type, but it should be understood that my invention is not restricted in this respect. Furthermore, modifications in the arrangement of parts and circuit connections may be effected without departing from the spirit and scope of my invention and such variations are intended to be covered by the appended claims.

I claim as my invention:

1. A voltage-indicating instrument comprising a laminated magnetizable core member subject to hysteretic losses only, a winding permanently disposed thereon, and a wattmeter mechanism adapted to measure the losses in said core member.

2. An electrical instrument for indicating average values of an alternating current voltage wave comprising an eddyless magnetizable core member, a winding therefor, and a power-measuring mechanism calibrated in volts to measure the energy consumed in said core member.

3. A voltage-indicating instrument comprising an eddyless magnetizable core member, a winding therefor, and electrical means for indicating the arithmetic average of the instantaneous values of an electromotive force wave impressed on said winding.

4. A voltage-indicating instrument comprising a laminated magnetizable core member subject to hysteretic losses only, a winding therefor and a wattmeter mechanism calibrated in volts for measuring the losses in the said core member.

5. In an instrument for indicating average voltage values of an alternating current wave, the combination with a consuming device comprising a core member, and a winding therefor, of means associated therewith that is calibrated in volts and dependent upon the maximum magnetic induction in said core member for measuring the energy consumed therein.

6. An instrument for indicating average values of an alternating-current voltage wave comprising an eddyless magnetizable core member, a winding permanently disposed thereon and a wattmeter calibrated in volts so connected as to measure the energy consumed in the said core member.

7. An instrument for indicating the average value of an alternating-current voltage wave comprising an eddyless magnetizable core member, a winding therefor and a wattmeter calibrated in volts for measuring the energy consumed in the said core member when the winding has impressed thereon an alternating-current voltage.

8. An electrical instrument for indicating average values of an alternating-current voltage wave comprising an eddyless magnetizable core member, a winding therefor and a compensated power-measuring instrument calibrated in volts for measuring the energy consumed in the said core member.

9. An electrical instrument for indicating average values of an alternating-current voltage wave comprising an eddyless magnetizable core member, a winding therefor and means calibrated in volts for measuring the energy consumed in the said core member.

10. A voltage-indicating instrument comprising means for consuming energy in accordance with the average value of the potential impressed thereon only and means associated therewith that is calibrated in volts for measuring the energy consumed in the energy-consuming means.

In testimony whereof, I have hereunto subscribed my name this 22nd day of March, 1911.

LEWIS W. CHUBB.

Witnesses:
  B. B. HINES,
  M. C. MERZ.